United States Patent
Schütz et al.

(10) Patent No.: US 12,458,213 B2
(45) Date of Patent: Nov. 4, 2025

(54) ENDOSCOPE WITH ENHANCED STEERING WIRE ARRANGEMENT

(71) Applicant: AMBU A/S, Ballerup (DK)

(72) Inventors: Günter Wilhelm Schütz, Augsburg (DE); Kaspar Matthison-Hansen, Helsingør (DK); Thomas Bachgaard Jensen, Copenhagen (DK); Helga Künzl, Kissing (DE)

(73) Assignee: AMBU A/S, Ballerup (DK)

( * ) Notice: Subject to any disclaimer, the term of this patent is extended or adjusted under 35 U.S.C. 154(b) by 365 days.

(21) Appl. No.: 17/922,031

(22) PCT Filed: Apr. 29, 2021

(86) PCT No.: PCT/EP2021/061316
§ 371 (c)(1),
(2) Date: Oct. 28, 2022

(87) PCT Pub. No.: WO2021/219811
PCT Pub. Date: Nov. 4, 2021

(65) Prior Publication Data
US 2023/0165444 A1    Jun. 1, 2023

(30) Foreign Application Priority Data
Apr. 30, 2020   (DE) .................... 10 2020 111 889.9

(51) Int. Cl.
*A61B 1/005*    (2006.01)

(52) U.S. Cl.
CPC .......... *A61B 1/0057* (2013.01); *A61B 1/0055* (2013.01)

(58) Field of Classification Search
CPC ............................ A61B 1/0055; A61B 1/0057
See application file for complete search history.

(56) References Cited

U.S. PATENT DOCUMENTS

| 4,873,965 A | 10/1989 | Danieli |
| 4,998,916 A * | 3/1991 | Hammerslag ..... A61M 25/0144 |
| | | 604/95.04 |

(Continued)

FOREIGN PATENT DOCUMENTS

| DE | 19627016 C1 | 2/1998 |
| DE | 102013226591 A1 | 6/2015 |

(Continued)

OTHER PUBLICATIONS

International Search Report and Written Opinion received for PCT Patent Application No. PCT/EP2021/061316, mailed on Jul. 14, 2021, 11 pages.

(Continued)

*Primary Examiner* — Michael J Carey
*Assistant Examiner* — Megan Elizabeth Monahan
(74) *Attorney, Agent, or Firm* — Faegre Drinker Biddle & Reath LLP

(57) ABSTRACT

An endoscope including at least one operating element, a steerable deflecting element located at the distal end, an endoscope tip, and a steering wire having a first portion, a second portion and an intermediate portion, wherein the intermediate portion is attached to the deflecting element or to the endoscope tip, operation of the at least one operating element to apply a drag force to the first portion moving the endoscope tip in a first direction, and operation of the at least one operating element or another operating element to apply a drag force to the second portion moves the endoscope tip in a second direction different from the first direction, and/or wherein the intermediate portion of the steering tie element is at least in part received in a clearance provided at/in a distal end portion of the deflecting element and/or at/in the endoscope tip.

19 Claims, 8 Drawing Sheets

(56) References Cited

U.S. PATENT DOCUMENTS

| | | | | |
|---|---|---|---|---|
| 5,325,845 | A | * | 7/1994 | Adair .................. A61B 1/0055 |
| | | | | 604/95.04 |
| 6,482,149 | B1 | * | 11/2002 | Torii .................. G02B 23/2476 |
| | | | | 600/141 |
| 8,052,597 | B2 | | 11/2011 | Boulais |
| 9,155,451 | B2 | | 10/2015 | Smith et al. |
| 9,220,398 | B2 | | 12/2015 | Woodley et al. |
| 9,585,546 | B2 | | 3/2017 | Surti et al. |
| 9,675,234 | B2 | | 6/2017 | Tsumaru et al. |
| 9,737,687 | B2 | * | 8/2017 | Armand ............ A61M 25/0138 |
| 9,820,634 | B2 | | 11/2017 | Simchony et al. |
| 2003/0036748 | A1 | | 2/2003 | Cooper et al. |
| 2004/0199052 | A1 | | 10/2004 | Banik et al. |
| 2005/0182298 | A1 | | 8/2005 | Ikeda et al. |
| 2007/0135803 | A1 | | 6/2007 | Belson |
| 2011/0295069 | A1 | | 12/2011 | Ouchi |
| 2012/0065628 | A1 | | 3/2012 | Naito |
| 2012/0238805 | A1 | | 9/2012 | Iwasaka et al. |
| 2013/0150666 | A1 | | 6/2013 | Otawara |
| 2013/0313882 | A1 | | 11/2013 | Yin et al. |
| 2015/0223671 | A1 | | 8/2015 | Sung et al. |
| 2015/0305598 | A1 | | 10/2015 | Yamashita |
| 2016/0316997 | A1 | | 11/2016 | Viebach et al. |
| 2017/0010457 | A1 | | 1/2017 | Nishijima |
| 2017/0065153 | A1 | | 3/2017 | Fujitani |
| 2019/0167070 | A1 | * | 6/2019 | Ide .......................... A61B 1/008 |
| 2019/0216298 | A1 | | 7/2019 | Lund et al. |
| 2019/0313882 | A1 | * | 10/2019 | Nakayama ........... A61B 1/0055 |
| 2020/0100648 | A1 | | 4/2020 | Jensen |
| 2020/0187765 | A1 | | 6/2020 | Ide |

FOREIGN PATENT DOCUMENTS

| | | |
|---|---|---|
| EP | 0301288 A1 | 2/1989 |
| EP | 1994872 A1 | 11/2008 |
| EP | 2679138 A1 | 1/2014 |
| EP | 2457491 B1 | 10/2014 |
| EP | 2529658 B1 | 3/2016 |
| EP | 2893949 B1 | 5/2017 |
| JP | 63-272321 A | 11/1988 |
| JP | 01-107301 U | 7/1989 |
| JP | 08-019618 A | 1/1996 |
| WO | 2019/049506 A1 | 3/2019 |

OTHER PUBLICATIONS

German Search Report received for DE Application No. 102020111889.9, mailed on Mar. 1, 2021, 17 pages (9 pages of English Translation and 8 pages of Original Document).

* cited by examiner

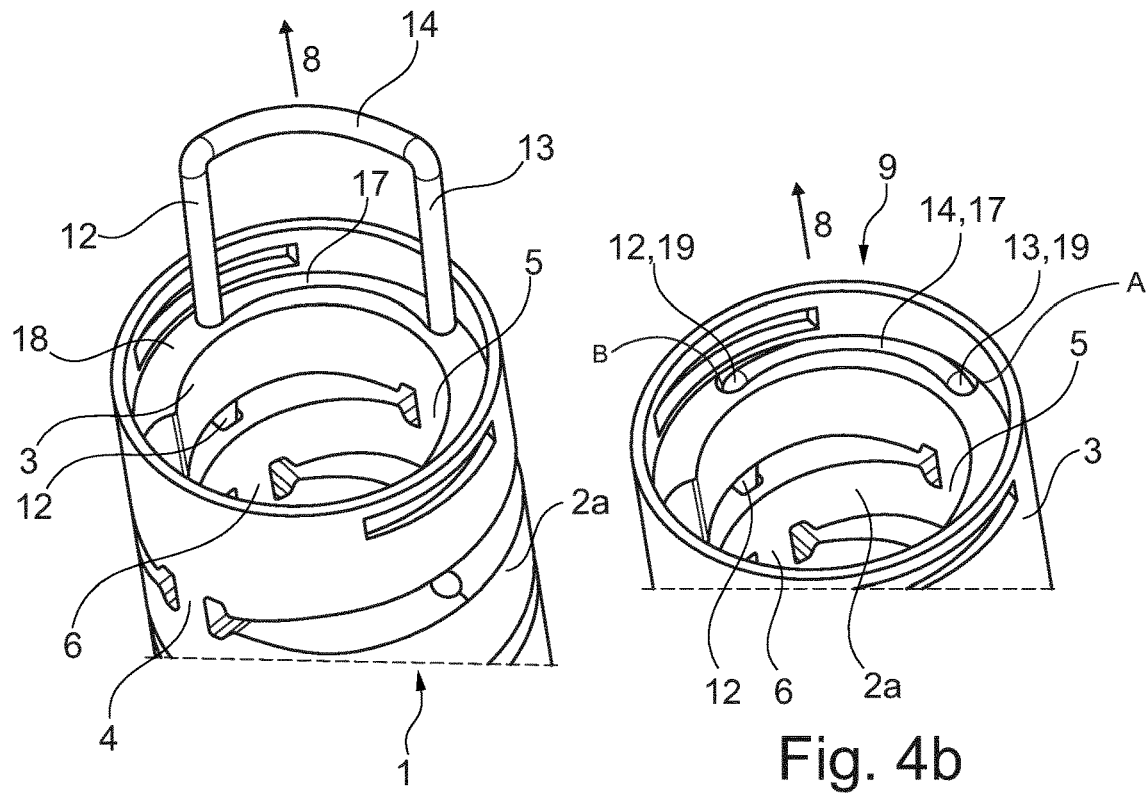
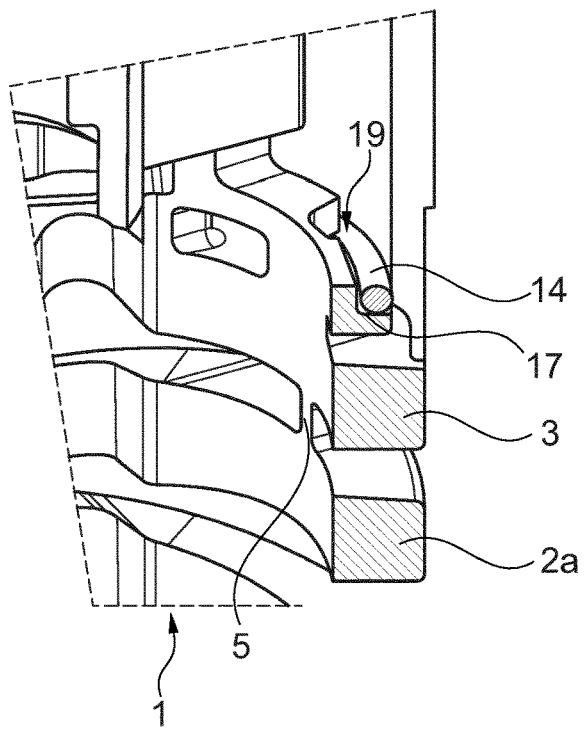
Fig. 4a
Fig. 4b
Fig. 4c

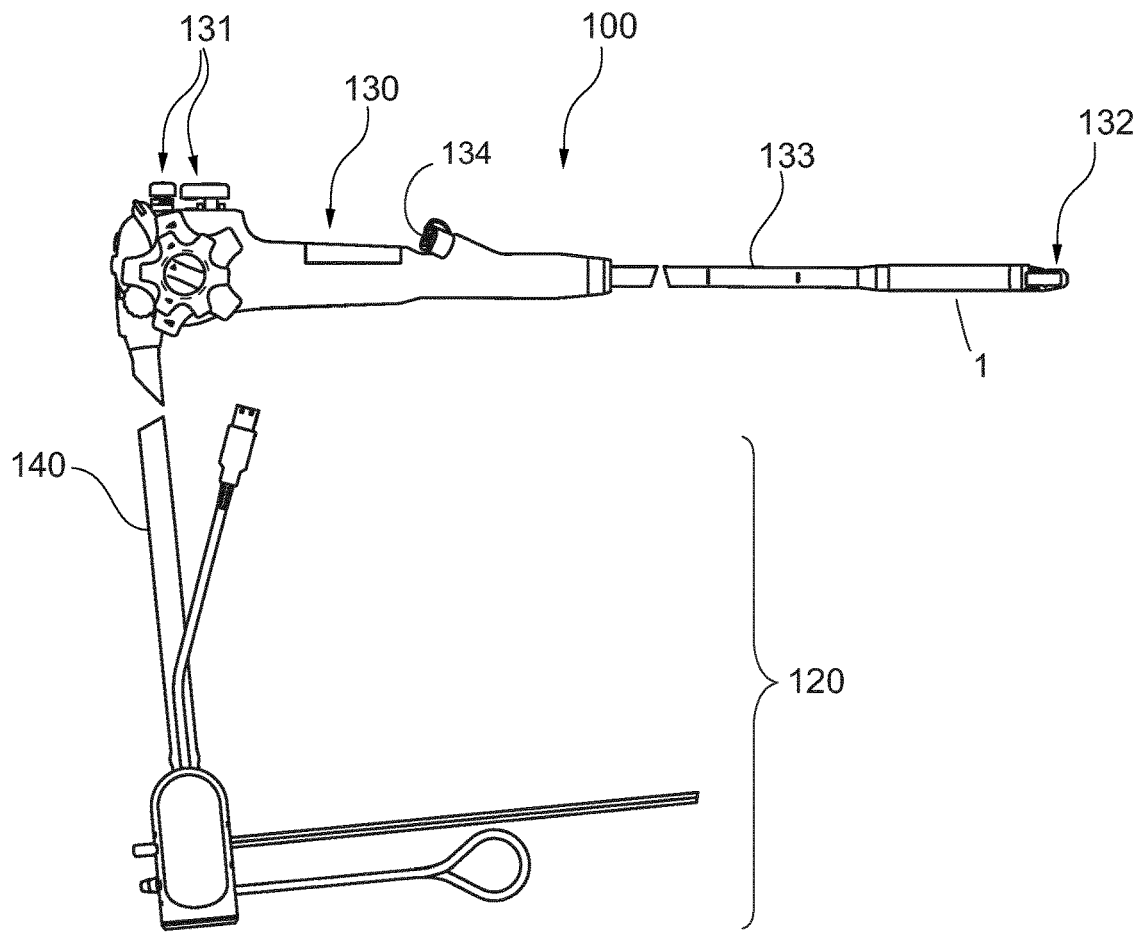
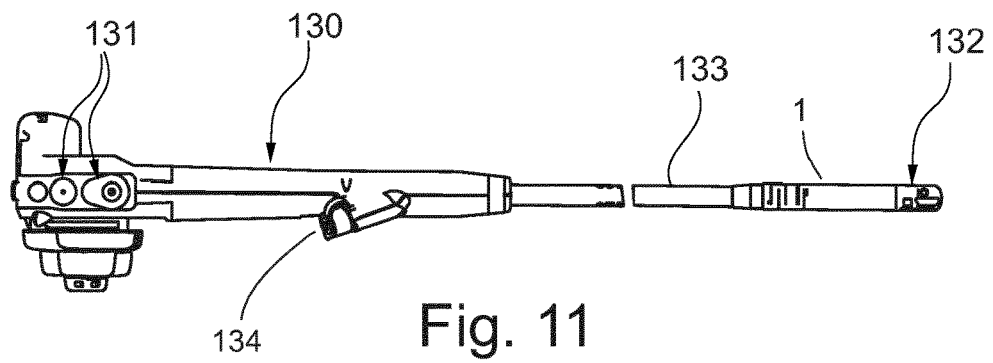
Fig. 11
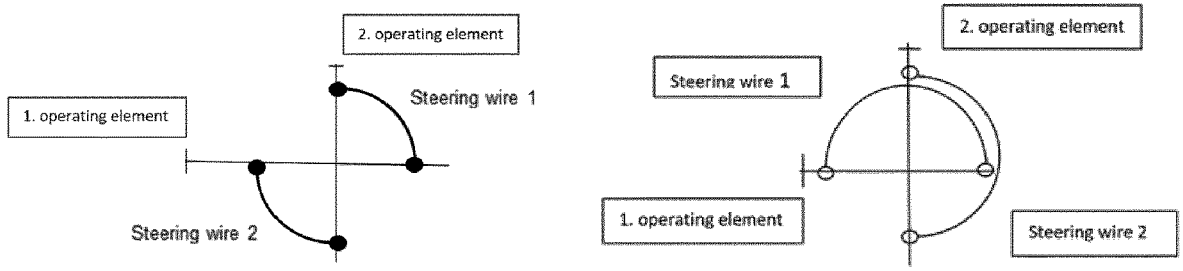
Fig. 12
Fig. 13

ENDOSCOPE WITH ENHANCED STEERING WIRE ARRANGEMENT

CROSS REFERENCE TO RELATED APPLICATIONS

This application is a National Stage entry under 35 U.S.C. § 371 of International Application No. PCT/EP2021/061316, filed Apr. 29, 2021, which claims priority from and the benefit of German Patent Application No. 10 2020 111 889.9, filed Apr. 30, 2020; said applications are incorporated by reference herein in their entirety.

TECHNICAL FIELD

The present disclosure refers to an endoscope, in particular single use endoscope, comprising at least one operating element, a steerable deflecting element, an endoscope tip, and a steering wire having a first portion, a second portion and an intermediate portion between the first portion and the second portion. The intermediate portion is attached to the deflecting element and/or to the endoscope tip, such that by operating the operating element the endoscope tip is moved.

BACKGROUND OF THE DISCLOSURE

Endoscopes and similar specialized instruments as in particular duodenoscopes, bronchoscopes, arthroscopes, colonoscopes (endoscopes for colon procedures), gastroscopes (endoscopes for gastro procedures) and laparoscopes are well known from the state of the art and are used for visual examination and diagnosis as well as to assist in surgery of different parts of the body. Generally, a conventional endoscope consists of a connector unit for connecting the endoscope with a supply unit for fluids, gas, light and energy, a control handle connected to the connector unit by a connecting hose/tube and a stiff or flexible (passively bendable/non-steerable), elongated insertion tube/insertion hose/insertion shaft, which on its proximal end is connected to the control handle and on its distal end is connected to a flexible, actively bendable/steerable deflecting element which carries a tip/head (endoscope tip, duodenoscope tip) on its distal end.

At this point, the expressions "distal" and "proximal" are defined for the whole application (including the description of the disclosure) as follows:
Distal: In the direction away from a user (toward the patient)
Proximal: In the direction toward the user (away from the patient)

In particular, for example, in the case of duodenoscopes the tip is an articulating tip, i.e. a tip that can be moved into different directions by actively/manually bending the deflecting element, and contains several functional components/smart features including illuminating means such as light-emitting diodes or fiber optic light guides connected to a proximal source of light, image capturing means such as a miniature video camera, and an elevator (working/guiding channel) for a surgical instrument like e.g. a forceps, scalpel, needle, etc., To move the endoscope tip it is well known to use steering tie elements, or so called steering wires. On their proximal end the steering wires are connected to an operating device like a number of individually actuateable hand wheels, while their distal end is fixed with a crimp or glue or similar connecting means to the tip or to the deflecting element. For every direction of movement there is provided one steering wire, i.e. for moving the tip forward and rearward as well as left and right, there are at least three, preferably four steering wires needed, one for each direction. However, it is a disadvantage of such a design that the single steering wires carry all the load (drag force) that is required to bend/move the tip in the concerning direction individually and separately to each other. This is, because a very critical load concentration (stress peak) appears in a region, where the single steering wires are connected to the deflecting element, which means in the area of the connecting means.

To reduce the load on the respective steering wire, it is known to fold the steering wire in its center (middle/intermediate wire portion), such that there are two, substantially parallel extending wire branches/portions. The open, proximal end of each branch/portion is connected to the same operating device provided at the control handle, while the closed distal end (bent portion) of the steering wire (where the two branches are connected to each other) is attached to the deflecting device or the endoscope tip. For example, U.S. Pat. No. 9,155,451 B2 discloses a torque-transmitting, variably-flexible device, comprising a hollow shaft/tube body having a proximal end and a distal end and a given length, a torque-transmitting element that extends substantially entirely over the given length of the hollow body and transmits torque from the proximal (extracorporal) end towards a deflecting element provided at the (intracorporal) distal end of the hollow shaft body, a steering element provided at the proximal end (or control handle) of the hollow shaft body that steers the distal deflecting element, wherein the steering element comprises steering tendons disposed within the hollow shaft body, wherein at least some of the steering tendons are individually adjustable in length for steering the distal deflecting element of the hollow shaft body, and stiffening tendons disposed within the hollow shaft body to selectively maintain the hollow shaft body in a relatively stiff condition, wherein the stiffening tendons are unassociated with the steering element of the device. At the distal tip/head of the endoscope there is a terminating bushing, which comprises through holes. The steering tendons are U-shaped, such that they comprise a first tendon branch/portion, a second tendon branch/portion and an intermediate (U-shaped) portion between the first branch and the second branch. The first branch is guided through a first hole of the terminating bushing, while the second branch is guided through a second hole of the terminating bushing, such that the intermediate portion is sharply bent at an angle of 180° relative to the first and second branches and is arranged on a side of the terminating bushing opposite the first branch and the second branch such that the concerning steering tendon (comprising the two branches and the U-shaped intermediate portion) gets anchored in/at the terminating bushing. While it is an advantage of the endoscope of U.S. Pat. No. 9,155,451 B2 that four U-shaped steering tendons (each comprising two parallel branches) are used instead of single (single-branched) steering tendons for each tilting/bending direction that individually have to be anchored at the tip for example by individually clamping and/or gluing, it is a drawback that the tendons are kept in position to the tip by form fit only, while additionally there is still a relative high stress concentration/notch effect at the position where the branches exit the holes, i.e. the position with the highest forces caused by the form fit. Therefore, it is possible that the steering tendons fail and rip exactly at their exit out of the holes of the terminating bushing. In addition, the number of branches get doubled compared to the single-branch concept which increases manufacturing costs (problematic for single-use designs) and makes the design of the deflecting element and the steering element more complicated.

EP 3 513 706 A1 discloses an endoscope, comprising an operating/control handle, an insertion tube/shaft with a proximal end and a distal end, and with a steerable tip part located at the distal end of the insertion shaft with a manually/actively steerable deflecting element in between, a control element movable in relation to the operating handle, a steering wire having first, second, and third wire portions, the first wire portion being connected to the steerable tip part, the second wire portion being located between the first and third wire portions, an adhesive provided on at least one surface of at least one of the second and third wire portions and an attachment member fixating and at least partly enclosing the second wire portion, the third wire portion, and at least a portion of the adhesive.

Due to the above problems, common endoscopes and in particular endoscope steering assemblies have a large number of parts, are less easy to assemble, and do not have a satisfying reliability and durability with regard to the connection between the steering tie elements/steering wires and the deflection element/the tip. Known approaches to minimize the aforementioned drawbacks are heavy in weight, rather complex and cost intensive, that is why they are less suited as single use devices, in particular for use in emergency medicine and mobile entities as ambulances, rescue helicopters and life boats.

SUMMARY OF THE DISCLOSURE

Against this background, the object of the present disclosure is to reduce the above-mentioned disadvantages of the prior art, and in particular to provide an endoscope (duodenoscope), which has a low number of parts, is lightweight, cost effective, easy to assemble and well suited for single use.

This object is achieved according to a first aspect of the present disclosure by an endoscope, in particular single use endoscope (duodenoscope), comprising
- at least one (proximal) operating element (manipulator wheel),
- an elongated insertion tube/insertion hose/insertion shaft having a proximal end and a distal end, said insertion shaft being preferably flexible to be (passively) bendable,
- an actively (manually) steerable deflecting element (actuatable by the operating element) located at the distal end of the insertion shaft (endoscope shaft),
- an endoscope tip/head distally arranged at the deflecting element (opposite to the shaft), and
- at least one steering tie element/steering wire having a first portion/branch, a second portion/branch and an intermediate (U-shaped) portion between the first portion/branch and the second portion/branch, wherein a proximal end of the first portion/branch and a proximal end of the second portion/branch of the one and the same steering wire are attached to the at least one and the same operating element or to two different operating elements, wherein
  the distal intermediate portion is attached/connected (preferably twisted) to the deflecting element and/or to the endoscope tip, such that by operating the at least one and the same operating element or the two different operating elements drag forces can be applied via the at least one and the same steering tie element/steering wire for moving the deflecting element/endoscope tip in two different directions, wherein
  by operating the at least one and the same operating element or the two different operating elements, respectively, so as to apply a drag force/pulling force exclusively to the first portion/branch of the at least one and the same steering tie element/steering wire, the endoscope tip is moved in a first direction and that by operating the at least one and the same operating element or the two different operating elements, respectively so as to apply a drag force/pulling force exclusively to the second portion branch of the at least one and the same steering tie element/steering wire the endoscope tip is moved in a second direction, wherein the first direction and the second direction are different from each other.

According to a further aspect of the disclosure, which can only optionally be combined with the above mentioned first aspect, the above object is achieved by an endoscope, in particular single use endoscope (duodenoscope), comprising
- at least one proximal operating element,
- an elongated insertion tube/insertion hose/insertion shaft having a proximal end and a distal end,
- a manually/actively steerable deflecting element located at the distal end of the insertion shaft,
- an endoscope tip/head distally arranged at the deflecting element, and
- at least one steering tie element/steering wire having a first portion/branch, a second portion/branch and an (U-shaped) intermediate portion between the first portion/branch and the second portion/branch, wherein
  a proximal end of the first portion/branch and a proximal end of the second portion/branch is/are attached to the at least one and the same operating element or to two different operating elements, wherein
  the intermediate portion (is located distal) is attached to the deflecting element or to the endoscope tip, such that by operating the at least one and the same operating element or the two operating elements, respectively, drag forces can be applied via the at least one and the same steering tie element to the deflecting element (preferably alternately) via the first and/or second branch of the same steering wire for moving the endoscope tip (preferably in different directions), wherein the (U-shaped) intermediate portion of the steering tie element is at least in part received in a clearance, in particular in a recess, a depression, a groove, an opening or a combination thereof, which clearance is provided at/in a distal end portion of the deflecting element and/or at/in the endoscope tip.

According to the disclosure the endoscope comprises (two) steering tie elements (of the above kind), for which in the following the term "steering wire" may also be used. This term "steering wire" has to be understood as designating any kind of steering tie element and in particular is not limited to any kind of material or similar. Similarly, the first and second portions may be referred to as first branch and second branch of the one and the same steering wire, respectively being interconnected by the (U-shaped) intermediate portion of the one and the same steering wire.

According to the disclosure the intermediate portion of the steering tie element is attached at/connected to/fixed at a distal end portion of the endoscope/deflecting element or the endoscope tip, such that the tip of the endoscope can be moved/tilted by virtue of the first portion/branch and the second portion/branch of the same steering tie element (in different directions). The first portion and the second portion of the steering tie element are generally referred to as the branches of the same steering tie element. In particular, the intermediate portion may be attached to a distal end portion of the deflecting element and/or to the tip, in particular to a tip housing. Additionally, or alternatively, the intermediate portion may be guided inside and optionally be attached to the tip housing. The steering tie element preferably is made from a steel material or a plastic material, for example, from Kevlar.

An important aspect is, that the at least one single steering wire is bent into the first branch and the second branch, both branches be used for bending the deflecting element into different directions. Contrary to U.S. Pat. No. 9,155,451 B2, where both branches of the bent steering wire are simultaneously loaded by a (one and the same) pull force in the same direction, i.e. both in the proximal direction, to bend the deflecting element exclusively into one single direction, according to the present disclosure only one of the two branches of one and the same steering wire is loaded by a pull force to bend the deflecting element into a first direction, while the remaining branch of the one and the same steering wire remains unloaded or is (simultaneously) loaded by another pull force to bend the deflecting element into a second direction different to the first direction. In both conditions, a frictional force in the longitudinal direction of the steering wire is generated between the intermediate portion of the one and the same steering wire and the deflecting element/the tip, which frictional force creates a tensile stress in the steering wire (especially in its intermediate portion), which tensile stress slowly increases in the longitudinal direction of the steering wire. Therefore, the disclosure avoids high stress peaks/tension peaks in the steering wire, especially in the connection area between the steering wire and the deflecting element.

A further aspect is to use a/one single steering tie element/steering wire for bending the deflecting element (and for moving/tilting the tip, accordingly), which also can be referred to as the active (manual) bending section of the endoscope shaft, in two different directions. In particular, the tip can be moved/tilted at least in four different directions, each of which is perpendicular to a longitudinal direction (direction from proximal to distal), while the four directions are angularly spaced from an adjacent direction preferably by 90°. The four directions can be referred to as forward (up), right, rearward (down) and left. According to the aforementioned aspects of the disclosure, one single steering tie element/steering wire is used for bending the deflecting element in two different directions of said four directions, e.g. up/down or right/left but preferably up/right, down/right, up/left or down/left or any other combination. The single steering tie element/steering wire in particular may move the tip either in the same plane (e.g. up/down or left/right) or in different planes (e.g. up/left or down/right). Providing the endoscope with two steering tie elements/steering wires (each comprises two branches being interconnected via the bent portion) allows bending of the deflecting element/moving of the tip in all four directions (up/down/left/right) in both planes.

In particular, the deflecting element may be a flexible, preferably elastic hollow cylinder made by a plurality of segments axially stringed together, which cylinder—by virtue of the steering tie elements-can be moved/bent preferably in any direction perpendicular to its longitudinal direction. Further, the (U-shaped) intermediate portion of the steering tie element/steering wire may be positioned in a groove cut in an axial surface of the deflecting element or of the tip. It is not necessary that the clearance is completely provided in the deflecting element, additionally or alternatively a side wall of a tip housing of the tip may provide a side of the clearance/groove. Alternatively or additionally, the intermediate portion of the steering tie element/steering wire may be positioned in a groove provided in a radial surface of the deflecting element or of the tip.

One important advantage is that the arrangement of the steering tie elements is more failsafe than common solutions, in particular in a case when the endoscope is pulled out with high forces. Another advantage is that the impact of stress concentration (stress peaks in the connection area between the wire and the deflecting) essentially can be reduced, as the contact area between the intermediate portion and the deflecting element/the tip is very large, such that frictional forces securing the intermediate portion are large. Due to the large contact area of the intermediate portion stress concentration can further be reduced by rounding/smoothening any edge/ridge the steering wire is bent over/passed over/runs across. Therefore, any strain on the steering wire due to e.g. stress concentration or squeezing can be reduced. The steering tie elements can be very thin, which further reduces the size, in particular the diameter, of the endoscope.

Advantageous embodiments of the disclosure are claimed in the dependent claims and are explained in more detail below.

According to one embodiment the first portion and the second portion of the one and the same steering tie element may be angularly offset to each other by an angle of about 90°, wherein in this case the branches of the same wire are preferably connected to two different operating elements.

More concretely, in case of the above 90° offset of the two branches of two steering wires (at least four tilting directions) the free end of the first portion/branch of the first steering wire is connected to the first operating element and the second portion/branch of the first steering wire is connected to a second operating element. Furthermore, the free end of the first portion/branch of the second steering wire is connected to the second operating element and the second portion/branch of the second steering wire is connected to the first operating element in accordance with the schema I shown in FIG. 12.

It is an advantage of this embodiment, that there is a big contact surface between the intermediate portion of the steering tie element and the deflecting element and/or the endoscope tip, which contact surface extends nearly over the entire angular range. Alternatively, the first portion and the second portion of the steering tie element may be angularly offset to each other by an angle of about 180° wherein in this case the branches of the same wire are preferably connected to one and the same operating element in a counter-rotating manner. Preferably, in this case the intermediate portion of the steering tie element does not directly cross the central channel of the deflecting element and the endoscope tip, respectively, but is wound around it, thereby entangling the deflecting element and/or the endoscope tip. Another advantage of this arrangement of the intermediate portion is that an inner channel of the insertion tube/the deflecting element/the endoscope tip is not covered/crossed by the steering tie elements, but is left free, such that there is free space for any duct or conduit connecting a functional unit in the tip with a base unit or a supply unit of the endoscope.

A further embodiment is characterized in that it comprises exactly two steering tie elements (wires), a first steering tie element and a second steering tie element, each having a first portion/branch, a second portion/branch and an (U-shaped) intermediate portion. Therefore, the two steering tie elements together have four branches, i.e. first and second portions, one branch for establishing movement in one of the four directions. This is to say that each steering tie element provides movement in two of the four directions.

According to a further embodiment, by operating the at least one operating element so as to apply a drag force to the first portion (first branch) of the second steering tie element the endoscope tip is moved in a third direction. Additionally, by operating the at least one operating element so as to apply a drag force to the second portion (second branch) of the second steering tie element the endoscope tip is moved in a fourth direction. The first direction, the second direction, the third direction and the fourth direction are different from each other.

According to a further embodiment each steering tie element (its branches) may be connected with one and the same operating element (in a counter-rotating manner), in which case a drag force is applied to the first branch/portion by operating the operating member in a first direction (second branch is kept unloaded), or a drag force is applied to the second branch/portion by operating the operating member in a second direction (first branch is kept unloaded). This concept may be advantageous especially in case the first portion and the second portion of the steering tie element are angularly offset to each other by an angle of about 180° (but of course also in case of) 90° in accordance with the schema II shown in FIG. 13.

Alternatively, as already stated above, the two branches of each steering tie element are connected to two different operating elements.

Finally, there may be one operating element for each single branch.

According to a further embodiment, the deflecting element comprises a (axially extending) passage (a channel or a hole) for each branch, i.e. for each of the first portion of the steering tie element and the second portion of the steering tie element. Preferably, the concerning branch is completely received within the concerning passage. As already stated above, the cylinder-shaped deflecting element in particular may comprise a number of segments, wherein, for example, each segment is connected to the distally adjacent segment by a first hinge and a second hinge and to the proximally adjacent segment by a third hinge and a fourth hinge. The hinges preferably are made integrally from a same material as the segments and allow the connected segments to bend relative to the adjacent segments in a bending plane defined by the concerning hinges. The bending plane defined by the first and the second hinge is perpendicular to the bending plane defined by the third and the fourth hinge, such that the deflecting element can bent in any direction perpendicular to the longitudinal direction of the endoscope. The segments of the deflecting element preferably have a ring-like form, such that all the segments form the hollow tubular deflecting element having a (central) channel inside guiding a surgical instrument and preferably a number of supply channels for receiving conduits as fluid conduits, electrical conduits and/or optical conduits. The first branch/portion and the second branch/portion of the steering tie element preferably are guided by at least some of the segments. For this aim, preferably each segment may comprise a number of openings arranged in the longitudinal direction, wherein the number of openings corresponds to the number of branches (first and second portions) of the endoscope. The segment openings arranged one upon the other in the longitudinal direction together provide the afore-said passage for one branch of the steering tie element, said passage extending in the longitudinal direction from proximal to distal. In particular, one branch of the steering tie element/steering wire (e.g. the first portion) may be threaded through a first passage of the deflecting element (e.g. for bending/moving in the up direction), while the other branch of the steering tie element/steering wire (e.g. the second portion) may be threaded through a second passage of the deflecting element (e.g. for bending/moving in the left direction). In this way, the middle section/intermediate portion (the part between the first portion and the second portion) of the steering tie element/steering wire forms two 90 bends® and runs along the periphery of the deflecting element/the tip.

A further embodiment of the present disclosure is characterized in that the intermediate portion is held in position by frictional forces between the intermediate portion and the deflecting element, in particular only by frictional forces. Such frictional forces are advantageous, as tension within the steering tie element change smoothly, different than in case of clamping the steering tie element/steering wire, where tension in the steering tie element changes/escalates abruptly. In result, there are less high tension areas in the steering tie element, which enhances durability and stability of the steering wires.

Preferably, the intermediate portion is stiffened with a resin material, in particular with an adhesive or glue. Stiffening the intermediate portion with adhesive in particular allows the steering tie element/steering wire to better transfer the drag forces/pulling forces acting therein into the deflecting element/the tip. The generation of frictional forces between the intermediate portion and the concerning contact surface of the deflecting element/tip is further enhanced. Stiffening is especially effective if the intermediate portion interacts with a bent or curved part/surface of the deflecting element/tip. Additionally or alternatively, a crimp may be applied to the intermediate portion. This also allows to better transfer the drag forces/pulling forces acting therein into the deflecting element/the tip, in particular if the intermediate portions interact with a bent or curved part of the deflecting element/the tip. It is also part of the disclosure that the intermediate portion of the steering tie element/steering wire may be fixed to the distal end section of the deflecting element and/or the tip with glue or a clamp. This inhibits or at least reduces slipping or sliding of the intermediate portion, such that there is a very good and secure transmittal of the drag force/pulling force from the steering tie element/steering wire to the deflecting element and/or the tip.

A further embodiment is characterized in that the clearance is provided in a radial direction in a circumferential surface of the deflecting element and/or in an axial direction in an axial surface of the deflecting element. In particular, the clearance may be provided in a radial direction in a circumferential surface of a (most) distal segment of the deflecting element and/or in an axial direction in an axial surface of a (most) distal segment of the deflecting element. This provides different possibilities for mounting/assembling of the steering tie elements and therefore a combination of the disclosure with different existing tips/tip housings/deflecting elements. Both versions provide an excellent and secure positioning/holding in place of the intermediate portion, as well as protection of the intermediate portion, which preferably is nearly completely received in the concerning clearance.

According to a further embodiment the clearance is provided by at least one through hole extending through the deflecting element in the radial direction, wherein the intermediate portion is threaded through the through hole from, in particular from radially inside to radially outside or vice versa. In particular, the clearance may be provided by at least one through hole extending through a (most) distal segment of the deflecting element in the radial direction. This embodiment further enhances the generation of frictional forces between the intermediate portion and the contact surface(s) of the deflecting element/tip. It further has been found to improve the mounting of the steering tie element/ steering wire.

A further embodiment is characterized in that the clearance is curved in the direction of the intermediate portion. Such a curved clearance has at least one curved contact surface for the intermediate portion. The provision of curved contact surfaces further enhances a generation of frictional forces.

A further embodiment is characterized in that the deflecting element comprises a plurality of segments, wherein adjacent segments are connected to each other by at least one hinge, wherein there is a gap between adjacent segments and/or hinges and wherein the first portion and/or the second portion of the steering tie element is threaded through the gap. In this embodiment common known deflecting elements can be used within the disclosure and the generation of frictional forces between the intermediate portion and the deflecting element is achieved by a kind of wrapping the intermediate portion around at least one of the segments, preferable around the most distal segment.

With other words one can say that the present disclosure provides an arrangement of steering tie elements/steering wires for a bending section of an endoscope, wherein two steering tie elements or steering wires counteract with the deflecting element/tip mainly by friction. In particular, the steering tie elements/steering wires may be arranged in/connected to a guide groove for the intermediate portion at a distal end side, in particular at an inner distal end side, of the bending section/deflecting element/tip. Each steering tie element/steering wire comprises a first branch and a second branch, which are not arranged to bend the bending section into the same direction. This means that in a 90° offset of the two branches of one single wire one of the branches of one steering tie element/steering wire is associated with an up or down operation and the other branch of the one steering tie element/steering wire is associated with a left or right operation of the tip, wherein in a 180° offset of the two branches of one single wire one of the branches of one steering tie element/steering wire is associated only with an up (or only with a right) operation and the other branch of the one steering tie element/steering wire is associated only with a down (or only with a left) operation of the tip.

In summary, it can be said that the disclosure in particular may provide the following advantages:
  No anchor is needed to terminate the steering tie elements/steering wires in the distal end of the deflecting element. Using an anchor requires a lot of space and represents a risk of failure if the anchor fails so the wire loosens.
  easy mounting of the steering tie elements/steering wires
  low number of parts
  possibility to use standard steering tie elements/steering wires without the need of using a special crimp or a soldered anchor.

BRIEF DESCRIPTION OF THE FIGURES

Further features and advantages of the present disclosure result from the following exemplary and non-limiting description of the figures. These are only schematic in nature and only serve to understand the present disclosure:

FIG. 4a shows a perspective view of an example of a deflecting element of an endoscope according to the disclosure, wherein the steering wire is not in its final position, FIG. 4b shows a perspective view of the example of FIG. 4a, wherein the steering wire is in its final position, FIG. 4c shows a sectional view of the example of FIGS. 4a and 4b, wherein the steering wire is in its final position, FIG. 11 shows a systematic view of an endoscope according to the disclosure, FIG. 12 shows a steering wire connection schema, and FIG. 13 shows another steering wire connection schema.

DETAILED DESCRIPTION

Figure 1:
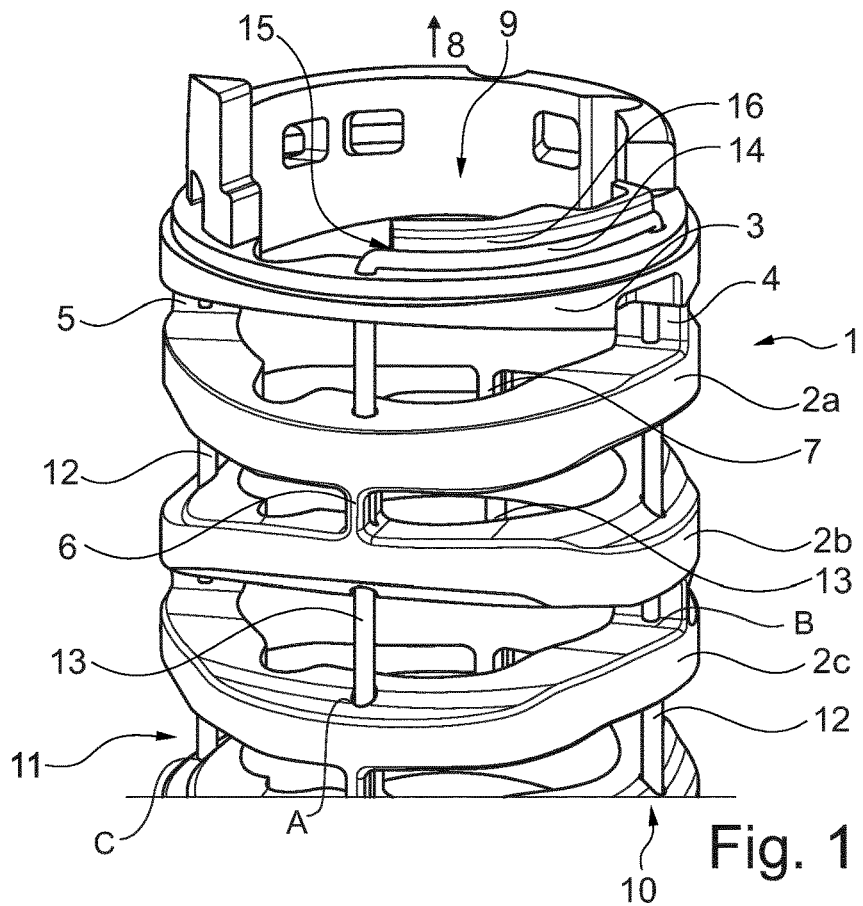
FIG. 1 shows a perspective view of an example of a deflecting element for an endoscope according to the disclosure.

To begin with, FIG. 11 shows the endoscope 100 of the present disclosure in its substantially complete structure.

Accordingly, the endoscope 100 is preferably a single use endoscope (duodenoscope) and comprises a connector unit 120 for connecting the endoscope 100 with a (separate) supply unit, which may also be referred to as a base unit, for at least one operating resource (for example, electric power, water, etc.). The endoscope 100 further comprises a supply line 140 located proximal (in the direction toward the user) to/at the connector unit 120. The supply line 140 is for supplying said at least one operating resource from the connector unit to an endoscope handle 130 which is designed to be held by a user and—in accordance with the manual actuations of several manipulators 131 at the handle 130 by the user—from the handle 130 to a distal (direction away from the user/direction toward the patient) endoscope tip/head 132, which is intended to be inserted into a patient's body cavity and which is located at the distal end of an endoscope shaft 133 which shaft 133 is mounted at its proximal end to the handle 130 and into which the supply line is extended. Furthermore, the endoscope shaft 133 comprises at least one so-called working channel 134 extending along the endoscope shaft 133 and having an opening in the tip 132 such that a surgical instrument can be shifted through the working channel 134 to extend beyond the tip 132 into a distal and/or radial direction. Furthermore, between the distal end of the endoscope shaft (insertion shaft) 133 and the endoscope head (tip) 132 a so-called deflecting element 1 is provided, which can be manually actuated for actively moving/tilting the tip 132 relative to the endoscope shaft 133. Here, the endoscope shaft is made flexible but it can also be made stiff.

FIG. 1 shows a perspective view of an example of such a deflecting element 1 for an endoscope according to the disclosure. The deflecting element 1 comprises a number of essentially plate- or ring-shaped segments, of which three segments 2a, b, c are shown. The deflecting element 1 is terminated at its distal end by a distal end segment 3. The segment 2a proximal to the distal end segment 3 is connected to the proximal end of segment 3 by a first hinge 4 and a second hinge 5. It is further connected to the proximally adjacent segment 2b by a third hinge 6 and a fourth hinge 7. At the distal side of the segment 3 there is attached a tip/head or a tip housing (shown in FIG. 11) of the endoscope.

The hinges 4, 5, 6, 7 are each made integrally from a same material as the segments 2 and allow the connected segments 2 to bend relative to the adjacent segments 2 in a bending plane defined by the concerning hinges 4, 5, 6, 7. As it is shown in the figures, the hinges 4, 5, 6, 7 are angularly offset to each other by 90°, such that the bending plane defined by the first hinge 4 and the second hinge 5 is perpendicular to the bending plane defined by the third hinge 6 and the fourth hinge 7. Therefore, the deflecting element 1 can bend/tilt in any direction perpendicular to the longitudinal direction 8 of the endoscope. Each segment 2, 3 has a ring-like form, such that all the segments 2, 3 together form the hollow tubular/cylindrical deflecting element 1 having a central channel 9 inside for receiving a surgical instrument and/or conduits (not shown in the figures) as fluid conduits, electrical conduits and/or optical conduits.

The endoscope further comprises a first steering tie element (first wire) 10 and a second steering tie element (second wire) 11, which in the following are referred to as the first steering wire 10 and the second steering wire 11. Each of the first and the second steering wires 10, 11 has a first portion 12, a second portion 13 and an intermediate portion 14 located between the first portion 12 and the second portion 13. In the following the first portion 12 may be referred to as the first branch 12, while the second portion 13 may be referred to as the second branch 13. It is not concretely shown in the figures, that a proximal end of the first branch 12 and a proximal end of the second branch 13 are attached to an operating element (as shown in FIG. 11) of the endoscope. The intermediate portion 14 is attached to the deflecting element 1 (additionally or alternatively it may be attached to the endoscope tip). As can be taken from the figures, when either the first branch 12 or the second branch 13 of the same steering wire are alternately objected to a pull force for bending the deflecting element 1 and moving the tip, the intermediate portion 14 is loaded by a pull force in its longitudinal direction, i.e. loaded by tensile stress. Therefore, a friction force is generated between the intermediate portion and the contact surface of the deflecting element 1 in the longitudinal direction of the steering wire.

By operating the operating element a drag force (pulling force) is introduced, for example, exclusively into the first branch 12 or exclusively into the second branch 13 for bending the deflecting element 1 and for moving the endoscope tip. In particular, by operating the operating element so as to apply the drag force (exclusively) into the first branch 12 of the first steering wire 10 the endoscope tip is moved in a first direction. By operating the operating element so as to apply a drag force (exclusively) into the second branch 13 of the first steering wire 10 the endoscope tip is moved in a second direction. By operating the operating element so as to apply the drag force exclusively into the first branch 12 of the second steering wire 11 the endoscope tip is moved in a third direction. By operating the operating element so as to apply a drag force exclusively into the second branch 13 of the second steering wire 11 the endoscope tip is moved in a fourth direction. Evidently, the first direction, the second direction, the third direction and the fourth direction are different from each other.

Figure 2:
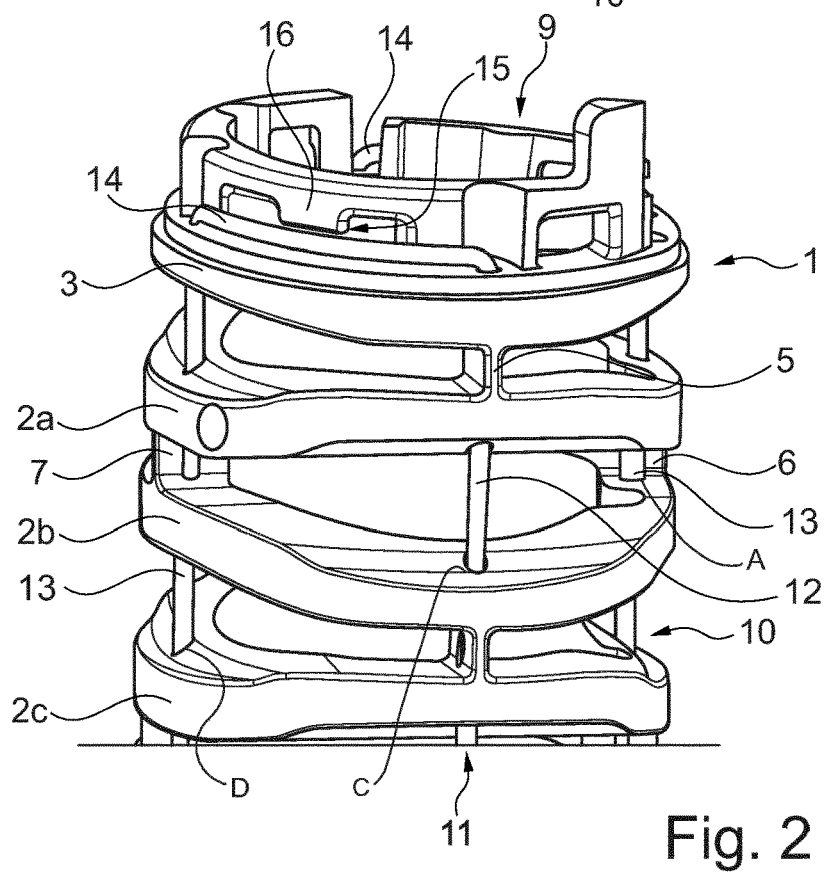
FIG. 2 shows the deflecting element of FIG. 1 in a perspective view from a different viewing direction.

FIGS. 1, 2 show an example of the disclosure, wherein the intermediate portion 14 of the first steering wire 10 and the intermediate portion 14 of the second steering wire 11 are each received in a clearance 15, here in form of a groove 15, which is provided in a radial direction in a circumferential (outer) surface 16 of the deflecting element 1.

More concretely, each segment 2a to 2c of the deflecting 1 is provided with at least four axial throughholes A to D oriented in the longitudinal direction of the endoscope and being distanced from each other in the circumference direction by 90°, respectively such that the through holes A and C are located opposite to each other and B and D are located opposite to each other. Furthermore, the through holes B and C are in line with the hinges 4 and 5, respectively, wherein the through holes A and D are in line with the hinges 6 and 7, respectively. The first branch 12 of the first steering wire 10 is fed through the through holes B in the distal direction, is then bent at the most distal axial surface of the distal segment 3 into the intermediate portion 14 which is finally bent into the second branch 13 being fed through the through holes A back in the proximal direction. In the same way, the second branch 12 of the second steering wire 11 is fed through the through holes C in the distal direction is then bent at the most distal axial surface of the distal segment 3 into the intermediate portion 14 and is finally bent into the second branch 13 being fed through the through holes D back in the proximal direction. This design corresponds to the above-mentioned connection schema I.

Furthermore, as can be seen especially in FIGS. 1 and 2, the distal (end) segment 3 comprises connection portions/sockets (having no reference signs) for connecting the endoscope tip to the deflecting 1.

FIGS. 4a, 4b, 4c, 5a, 5b and 5c show an example (improvement of the embodiment according to FIGS. 1 and 2), wherein the intermediate portions 14 of the first steering wire 10 and the intermediate portion 14 of the second steering wire 11 are each received in a clearance 17, here in form of a groove 17, which are provided in an axial direction in an axially distal end surface 18 of the deflecting element 1, especially of the distal (end) segment 3. It is shown in the figures that the clearance 15, 17 are provided at and in a distal end portion of the deflecting element 1, i.e. the distal segment 3 of the deflecting element 1. Additionally, or alternatively the clearance 15, 17 may be provided at/in the endoscope tip (not shown in FIGS. 4a to c). In the example of FIGS. 4a, 4b and 4c the clearance 17 is provided in the distal segment 3, wherein a side wall of a tip housing of the tip provides a side of the clearance 17, while in the example of FIGS. 5a, 5b and 5c the clearance 17 is provided at the distal segment 3, here by a bridging part 26.

More concretely, according to the embodiment of FIGS. 4*a* to *c*, the distal axial end surface of the distal segment 3 of the deflecting element 1 comprises two arc-shaped grooves 17 (of about 90° circumferential length) connecting the through holes A with B and C with D, respectively such that the intermediate portions 14 of each steering wire 10, 11 are substantially completely accommodated therein as shown especially in FIG. 4*b*. Therefore, the clearances 15, 17 surround/encapsulate the intermediate portions 14 for a certain angular area, which enhances the generation of frictional forces (in the longitudinal direction of the respective steering wire) between each intermediate portion 14 and its contact surface of the deflecting element 1 in case a pulling force is applied to (only) one of the branches 12, 13.

Figure 5A:
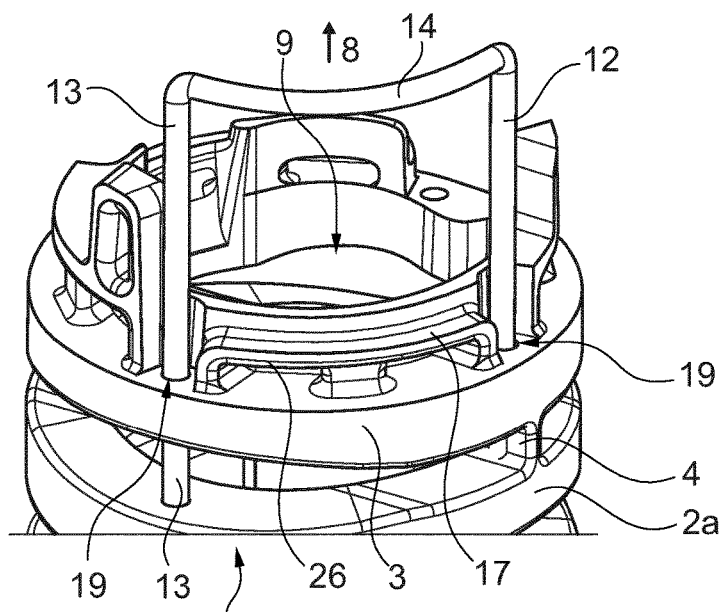
FIG. 5a shows a perspective view of an example of a deflecting element of an endoscope according to the disclosure, wherein the steering wire is not in its final position.
Figure 5B:
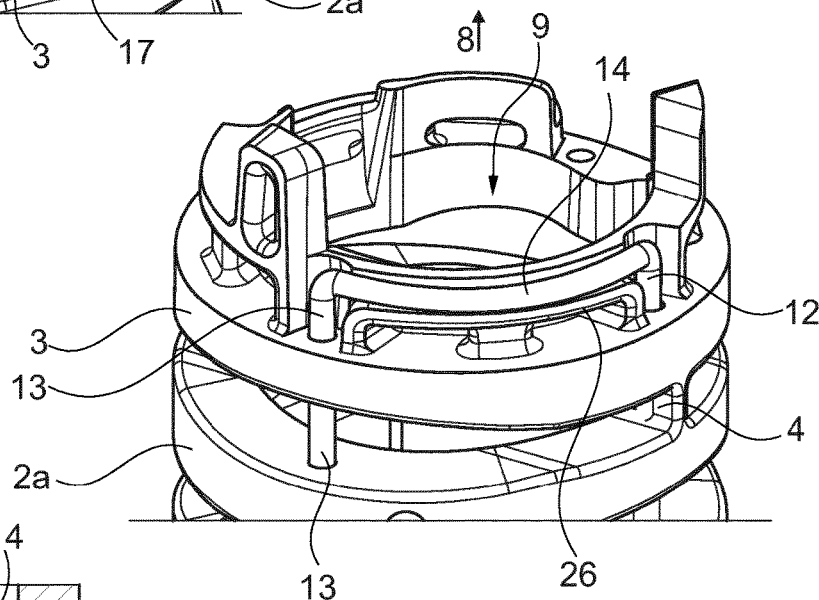
FIG. 5b shows a perspective view of the example of FIG. 5a, wherein the steering wire is in its final position.
Figure 5C:
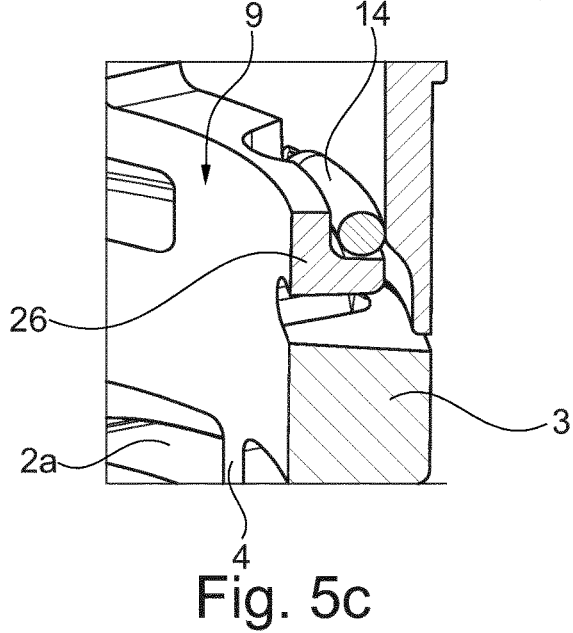
FIG. 5c shows a sectional view of the example of FIGS. 5a and 5b, wherein the steering wire is in its final position.
Figure 6A:
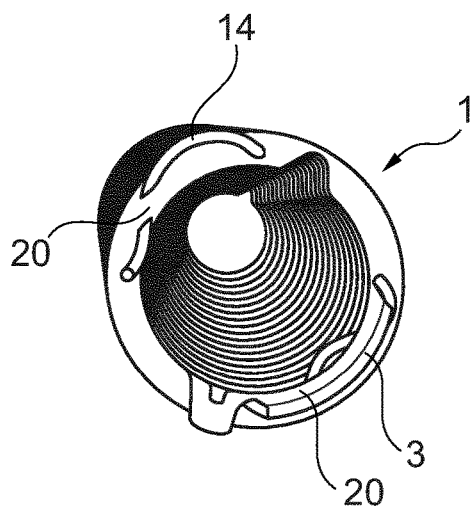
FIG. 6a shows a top view of an example of a deflecting element of an endoscope according to the disclosure.
Figure 6B:
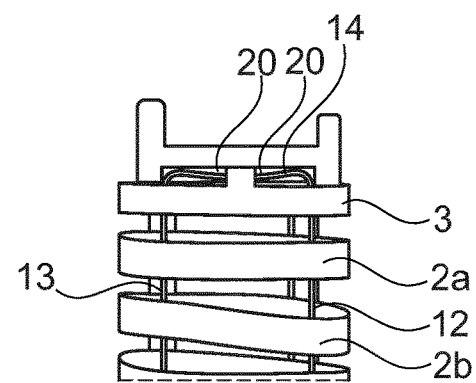
FIG. 6b shows a side view of the example of FIG. 6a, FIG. 6c shows a perspective view of the example of FIGS. 6a and 6b.
Figure 6C:
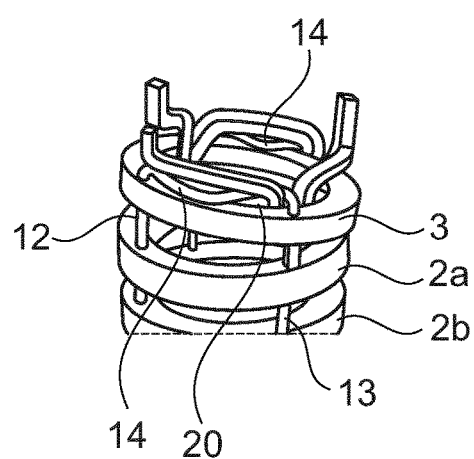
FIG. 6d shows a perspective view of the example of FIGS. 6a, 6b and 6c from a different viewing direction.
Figure 6D:
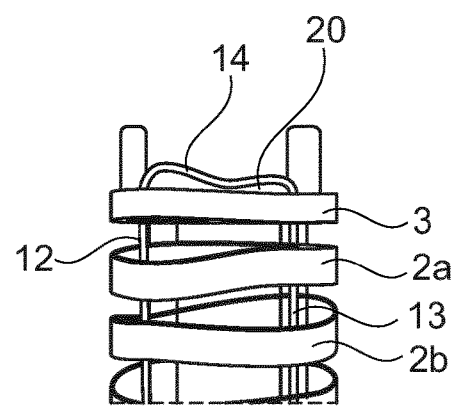

As already stated above, the clearances 15, 17 are not necessarily formed by the arc-shaped grooves in the distal segment 3 but can also be provided by the bridging part 26 as shown in the FIG. 5*a* to *c*. In this case an additional design element (namely the bridging part 26) is integrally formed with the distal segment 3 having a bracket-like shape and bridging the circumferential distance between the through holes A and B as well as C and D, respectively.

Figure 3A:
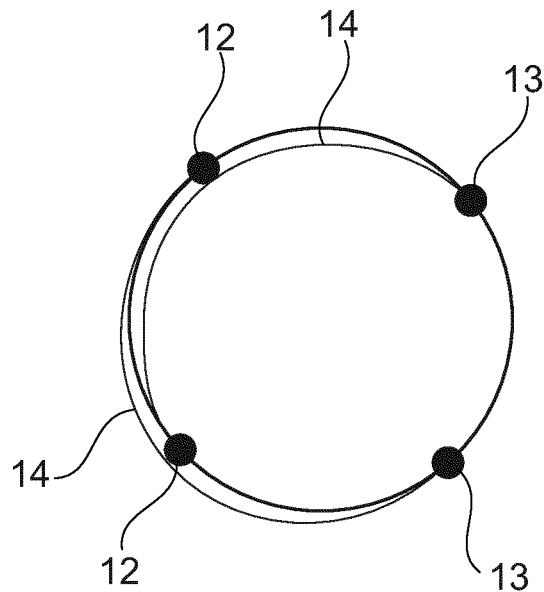
FIG. 3a shows a schematic top view of a first arrangement of the steering wires.
Figure 3B:
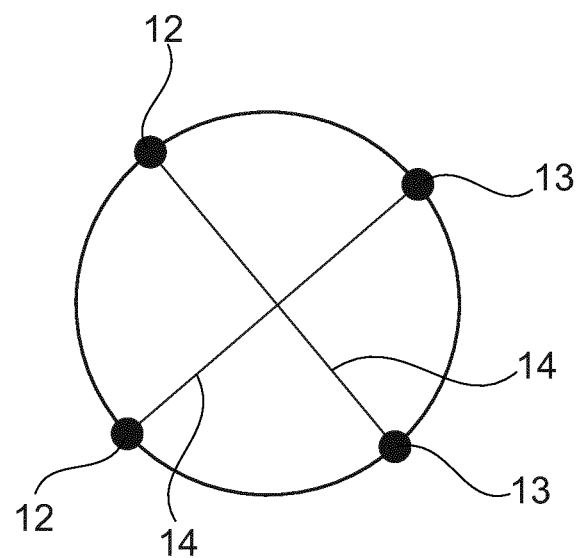
FIG. 3b shows a schematic top view of a second arrangement of the steering wires.

While in any of figures the first branch 12 and the second branch 13 are shown in an angular displacement of 90° (when seen in circumferential direction), alternatively they may be arranged in an angular displacement of 180°, see also FIGS. 3*a* and 3*b*, which further enlarges the area of contact between the intermediate portions 14 and the deflecting element 1 and therefore enhances the generation of frictional forces. FIG. 3*a* shows an example of a 180°-arrangement, wherein the intermediate portions 14 of the first steering wire 10 and the second steering wire 11 do not directly cross the central channel 9 of the deflecting element 1, but are wound around it in an arc-like manner, thereby entangling the deflecting element 1. It is an advantage of this arrangement that the central channel 9 is not covered/crossed by the steering wires 10, 11, but is left free, such that there is free space for any duct or conduit connecting functional unit in the tip with a base unit or supply of the endoscope. Alternatively and as shown in FIG. 3*b*, the intermediate portions 14 of the first steering wire 10 and the second steering wire 11 may directly cross the central channel 9 of the deflecting element 1. In any of the shown possibilities, the steering wires 10, 11 each forms two (serial) 90° bends (from the longitudinal direction 8/the first branch 12 into the circumferential direction/the intermediate portion 14 and from the circumferential direction/the intermediate portion 14 into the longitudinal direction 8/the second branch 13), such that the intermediate portion 14 (thereby achieving substantially an U-shape) runs along the (circumferential) periphery of the deflecting element 1 (especially the distal segment 3). It is shown in the figures, that the clearance 15 as well as the clearance 17 is curved in the direction of the intermediate portion 14, which further enhances the generation of frictional forces.

As already stated above, the first branch 12 and the second branch 13 are each guided by the segments 2*a* to *c* and 3 of the deflecting element 1. Each segment 2*a* to *c* and 3, therefore, comprises a number of openings (through holes) 19 arranged in the longitudinal direction 8 and are distinguished in the above mentioned pairs of through holes A and B as well as C and D. These segment openings/through holes 19 arranged one upon the other in the longitudinal direction 8 and together provide a passage for one branch 12, 13 of the steering wires 10, 11. Said passage extends in the longitudinal direction 8 from proximal to distal.

FIGS. 6*a* to 6*d* show a further example, wherein a clearance 20 is provided by a number of through holes 20 extending through the distal segment 3 of the deflecting element 1 in a circumferential and/or radial direction (perpendicular to the longitudinal direction 8) thereby forming a kind of loops or eyes for receiving the intermediate portion 14 of the respective steering wires 10, 11. In other words, the intermediate portion 14 of each, the first steering wire 10 and the second steering wire 11, is threaded through each through hole 20 from radially inside to radially outside or vice versa along the circumferential direction between two longitudinal through holes 19, thereby increasing the friction effect between the steering wire and the deflecting.

FIGS. 7 to 10 show a further example of the present disclosure. Accordingly, the steering wires 10, 11 and especially their intermediate portions 14 are connected to the endoscope tip/head and more concretely to a receiving element/casing for/of the endoscope tip/head which receiving element represents the distal segment 3 of the deflecting 1. However, it is also possible that the distal segment 3 is a simple final segment of the deflecting 1 at which a separate endoscope head is distally fixed.

Figure 9:
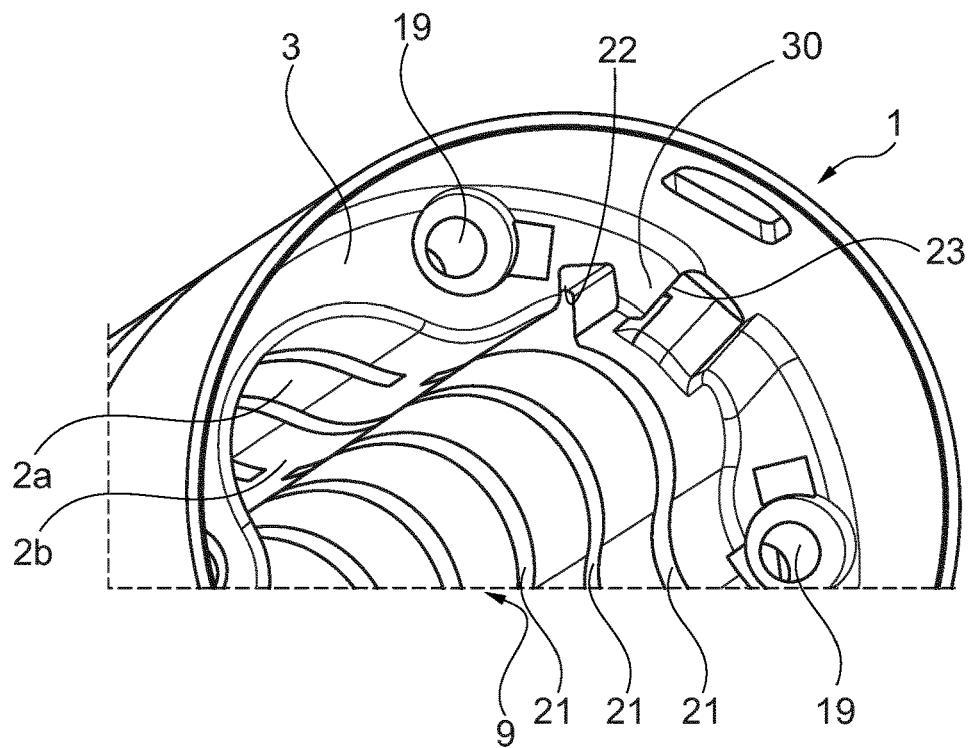
FIG. 9 shows a perspective view of the example of FIGS. 7 and 8 with steering wire from a different viewing direction.
Figure 10:
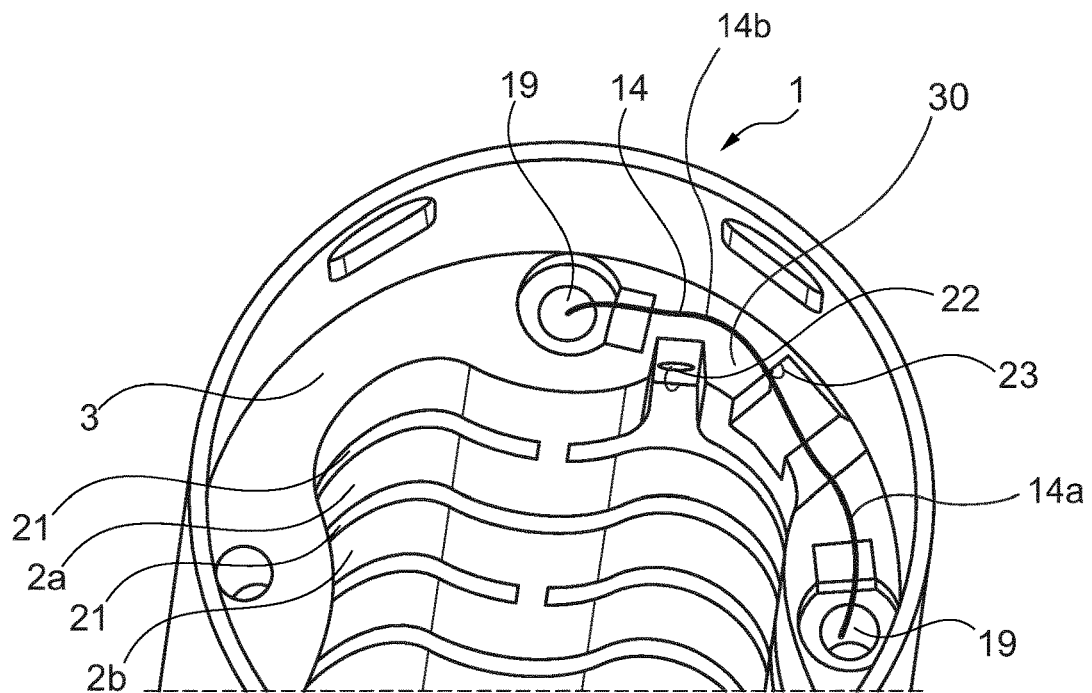
FIG. 10 shows an enlarged detail of FIG. 9.

As shown especially in FIGS. 9 and 10, the distal segment 3 comprises a number of longitudinally (axially) extending through holes 19 at/in a circumferential wall thereof (only two through holes 19 for one single steering wire, being defined as first axial passage and second axial passage, are shown in FIGS. 9 and 10 wherein, however four through holes 19 for two steering wires are provided) leading to the respective through holes 19 at the proximal neighboring segment 2*a* and distally ending radially inside the segment 3. Furthermore, when seen in the circumferential direction both axial through holes 19 (first and second axial passages) as shown in the figures are distanced from each other by an angle of about 90°. Between the two axial through holes 19 (first and second axial passages) two radially extending through bores/1117US-18-radial openings 22, 23 are provided being separated from each other in the circumferential direction thereby generating a separation wall 30 in between.

Figure 7:
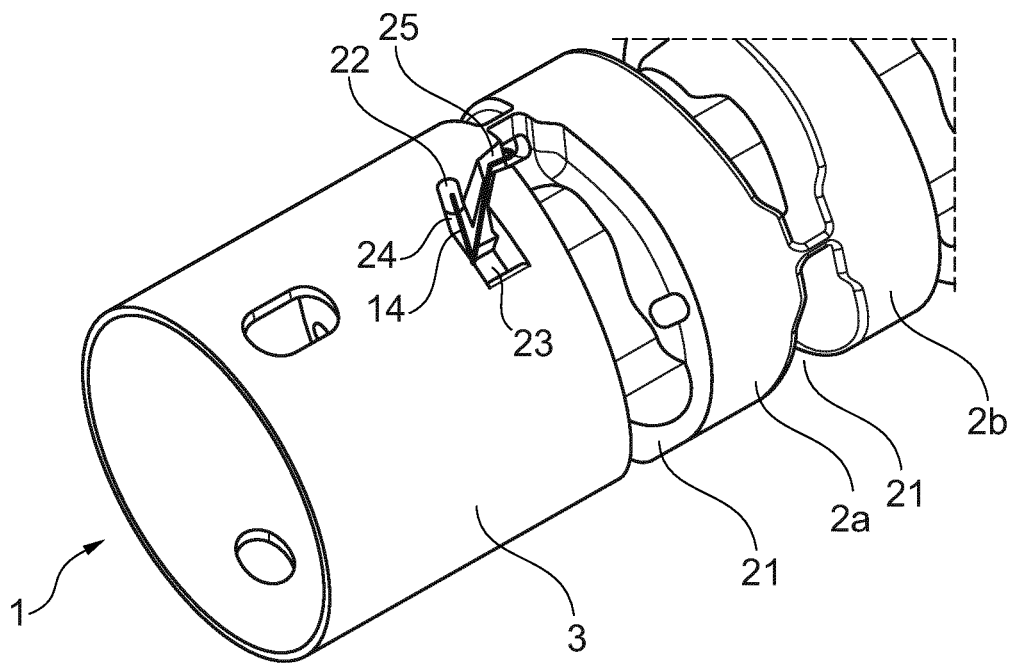
FIG. 7 shows a perspective view of an example of a deflecting element of an endoscope according to the disclosure, wherein the steering wire has been omitted.
Figure 8:
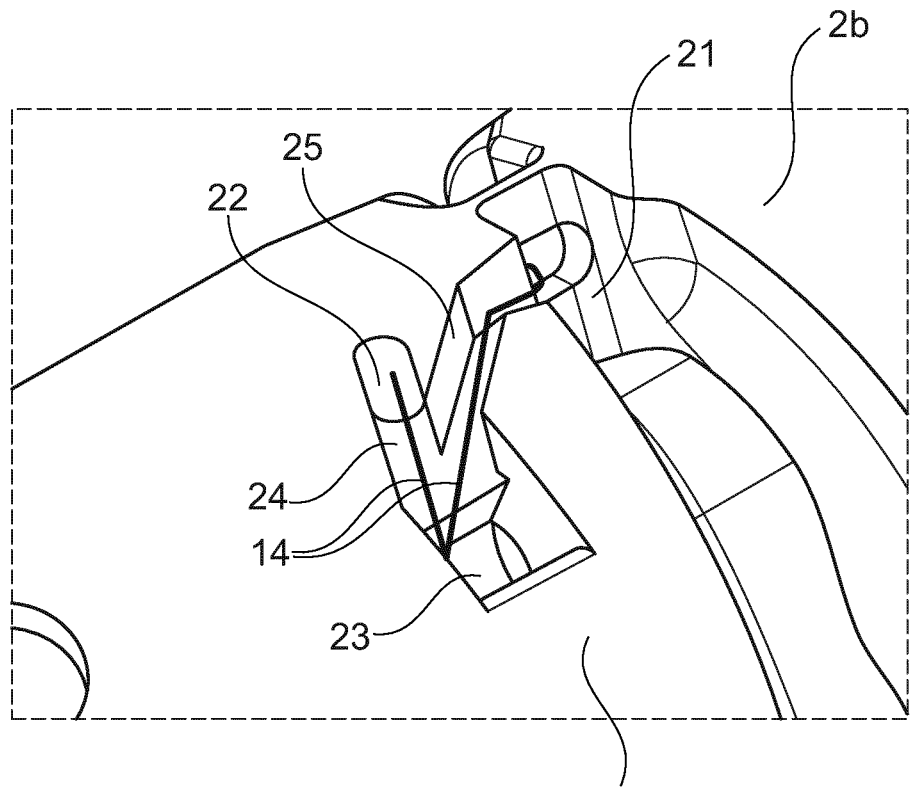
FIG. 8 shows a perspective view of the example of FIG. 7 with steering wire.

Finally, as can be seen especially in the FIGS. 7 and 8 the distal segment 3 has an outer axially extending (first) groove/channel 25 starting from the proximal end surface of the distal segment 3 and ending at the one 23 of the two radial openings wherein both radial openings 22, 23 are linked by an outer circumferentially extending (second) groove/channel 24.

The steering wires 10, 11 can be attached to the deflecting element 1 by performing the following steps which steps are shown in the FIGS. 7, 8 and 10 on the basis of only one of the two steering wires 10, 11:

Step 1: bending the steering wires 10, 11 thereby forming the first branch 12, the second branch 13 and the intermediate portion 14 which intermediate portion 14 can be divided into a first and second steering wire parts 14*a*, 14*b* and a middle steering wire section 14*c*.

Step 2: arranging the middle steering wire section 14*c* between the first opening 22 and a gap 21 generated between the two neighboring segments 2 and 2*a* on the internal side of the deflecting element 1, (i.e. in the central channel 9), Step 3: drawing the first steering wire part 14*a* through the gap 21 between the bending segments 2*a*, 3 to the external side of the deflecting element 1

Step 4: drawing the second steering wire part 14*b* through the first radial opening 22 to the external side of the deflecting section 1

Step 5: placing the first steering wire part 14*a* in the first outside groove 25 and drawing the first steering wire part 14a through the second radial opening 23 to the internal side of the deflecting element 1, (i.e. into the central channel 9), Step 6: placing the second steering wire part 14b into the second outside groove 24 and drawing the second steering wire part 14b through the second radial opening 23 to the internal side of the deflecting element 1, (i.e. into the central channel 9), Step 7: inserting the first branch 12 into the opening 19 (first passage) for the first branch 12 and threading the first branch 12 through all openings 19 of all segments 2, 3 of the deflecting element 1 from distal to proximal, Step 8: inserting the second branch 13 into the opening 19 (second passage) for the second branch 13 and threading the second branch 13 through all openings 19 of all segments 2, 3 of the deflecting element 1 from distal to proximal.

To summarize the gist of the present disclosure, it refers to an endoscope, in particular single use endoscope, comprising at least one operating element, an elongated insertion tube/insertion hose having a proximal end and a distal end, a steerable deflecting element 1 located at the distal end, an endoscope tip distally arranged at the deflecting element 1, and at least one steering tie element 10, 11 having a first portion 12, a second portion 13 and an intermediate portion 14 between the first portion 12 and the second portion 13, wherein at least one of a proximal end of the first portion 12 and a proximal end of the second portion 13 is/are attached to the at least one operating element, wherein the intermediate portion 14 is attached to the deflecting element 1 or to the endoscope tip, such that by operating the operating element a drag force can be applied via the steering tie element 10, 11 to the deflecting element 1 for moving the endoscope tip, wherein by operating the at least one operating element so as to apply a drag force to the first portion 12 of the steering tie element 10, 11 the endoscope tip is moved in a first direction and that by operating the at least one operating element so as to apply a drag force to the second portion 13 of the steering tie element 10, 11 the endoscope tip is moved in a second direction, wherein the first direction and the second direction are different from each other and/or wherein the intermediate portion 14 of the steering tie element 10, 11 is at least in part received in a clearance 15, 17, 20, 22, 23, 24, 25, in particular in a recess, a depression, a groove, an opening or a combination thereof, which clearance 15, 17, 20, 22, 23, 24, 25 is provided at/in a distal end portion of the deflecting element 1 and/or at/in the endoscope tip.

REFERENCE SIGNS 1 deflecting element
2, 2a,b,c segment
3 distal end segment
4 first hinge
5 second hinge
6 third hinge
7 fourth hinge
8 longitudinal direction
9 central channel
10 first steering tie element, first steering wire
11 second steering tie element, second steering wire
12 first portion, first branch
13 second portion, second branch
14 intermediate portion
14a first steering wire part of intermediate portion
14b second steering wire part of intermediate portion
14c middle steering wire section of intermediate portion
15 clearance, groove
16 circumferential surface
17 clearance, groove
18 axial surface
19 opening
20 clearance, through hole
21 gap
22 clearance, radial opening
23 clearance, radial opening
24 second outside groove
25 first outside groove
26 bridging part
30 separation wall
100 endoscope
120 connection unit
130 control handle
131 operating elements
132 endoscope head
133 endoscope shaft
134 working channel
140 supply line

What is claimed is:

1. An endoscope comprising:
a first manipulator wheel;
a second manipulator wheel;
an insertion tube having a proximal end and a distal end;
a deflecting element located at the distal end of the insertion tube, the deflecting element being steerable and comprising a plurality of segments interconnected by hinges;
an endoscope tip distally arranged at the deflecting element;
a first steering wire having a first portion, a second portion and an intermediate portion between the first portion and the second portion;
a second steering wire having a first portion, a second portion and an intermediate portion between the first portion and the second portion,
wherein the first manipulator wheel is connected to the first portion of the first steering wire and to the first portion of the second steering wire,
wherein the second manipulator wheel is connected to the second portion of the first steering wire and to the second portion of the second steering wire,
wherein the intermediate portion of the first steering wire is attached to the bending section and/or to the endoscope tip,
wherein the first manipulator wheel is configured to apply a drag force to the first portion of the first steering wire to move the endoscope tip in a first direction, and
wherein the second manipulator wheel is configured to apply a drag force to the second portion of the first steering wire to move the endoscope tip in a second direction different from the first direction, the first direction and the second direction lying on different planes.

2. The endoscope of claim 1, wherein the first direction is perpendicular to the second direction.

3. The endoscope of claim 1, wherein the first portion and the second portion of the first steering wire are angularly offset to each other by 90° degrees.

4. The endoscope of claim 1, wherein the first portion and the second portion of the first steering wire are angularly offset to each other by180° degrees.

5. The endoscope of claim 1, wherein the first manipulator wheel is configured to selectively move the endoscope tip in the first direction and/or a third direction, wherein the second manipulator wheel is configured to selectively move the endoscope tip in the second direction and/or a fourth direction, and wherein the first direction, the second direction, the third direction and the fourth direction are different from each other.

6. The endoscope of claim 5, wherein the first direction and the third direction are in a first plane, and wherein the second direction and the fourth direction are in a second plane, and wherein the first plane is perpendicular to the second plane.

7. The endoscope of claim 5, wherein the intermediate portion of the first steering wire is held in position by frictional forces between the intermediate portion and the bending section.

8. The endoscope of claim 5, further comprising a resin material provided on, to stiffen, the intermediate portion of the first steering wire.

9. The endoscope of claim 5, wherein the intermediate portion of the first steering wire comprises a crimp.

10. The endoscope of claim 1, wherein the intermediate portion of the first steering wire is at least in part received in a clearance, wherein the clearance is provided at or in a distal end portion of the deflecting element.

11. The endoscope of claim 10, wherein the clearance consists of a recess, a depression, a groove, an opening or a combination thereof.

12. The endoscope of claim 10, wherein the clearance is provided in a radial direction in a circumferential surface of the deflecting element, and/or in an axial direction in an axial surface of the deflecting element.

13. The endoscope of claim 12, wherein a distal segment of the deflecting element comprises the circumferential surface and/or the axial surface.

14. The endoscope of claim 10, wherein the clearance is provided in a radial direction by at least one through hole extending through the deflecting element in the radial direction, and wherein the intermediate portion of the first steering wire is threaded through the at least one through hole.

15. The endoscope of claim 14, wherein the intermediate portion of the first steering wire is threaded from radially inside to radially outside or vice versa.

16. The endoscope of claim 14, wherein a distal segment of the deflecting element comprises the at least one through hole.

17. The endoscope of claim 10, wherein the clearance is curved in a direction of the intermediate portion.

18. An endoscope comprising:
a first manipulator wheel;
a second manipulator wheel;
an insertion tube having a proximal end and a distal end;
a deflecting element located at the distal end of the insertion tube, the deflecting element being steerable and comprising a plurality of segments interconnected by hinges;
an endoscope tip distally arranged at the deflecting element;
a first steering wire having a first portion, a second portion and an intermediate portion between the first portion and the second portion,
a second steering wire having a first portion, a second portion and an intermediate portion between the first portion and the second portion,
wherein a proximal end of the first portion of the first steering wire and a proximal end of the second portion of the first steering wire are attached, respectively, to the first manipulator wheel and to the second manipulator wheel,
wherein the intermediate portion of the first steering wire is attached to the deflecting element and/or to the endoscope tip, and
wherein the intermediate portion of the first steering wire is at least in part received in a clearance provided at or in a distal end portion of the deflecting element.

19. An endoscope comprising:
a first manipulator wheel;
a second manipulator wheel;
an insertion tube having a proximal end and a distal end;
a deflecting element located at the distal end of the insertion tube, the deflecting element being steerable and comprising a plurality of segments interconnected by hinges;
an endoscope tip distally arranged at the deflecting element; and
a first steering wire having a first portion, a second portion and an intermediate portion between the first portion and the second portion, a proximal end of the first portion of the first steering wire being attached to the first manipulator wheel; and
a second steering wire having a first portion, a second portion and an intermediate portion, a proximal end of the first portion of the second steering wire being attached to the first manipulator wheel,
wherein the intermediate portion of the first steering wire is attached to the deflecting element and/or to the endoscope tip,
wherein the first manipulator wheel is configured to apply a drag force to the first portion of the first steering wire to move the endoscope tip in a first direction, and
wherein the second manipulator wheel is configured to apply a drag force to the second portion of the first steering wire to move the endoscope tip in a second direction different from the first direction, the first direction being perpendicular to the second direction.

* * * * *